Oct. 23, 1956  L. M. KISSNER ET AL  2,767,511
INSECTICIDE VAPORIZERS
Filed Dec. 5, 1951
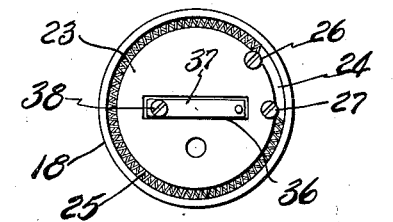
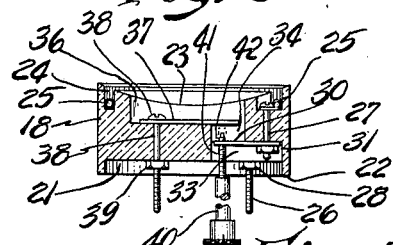
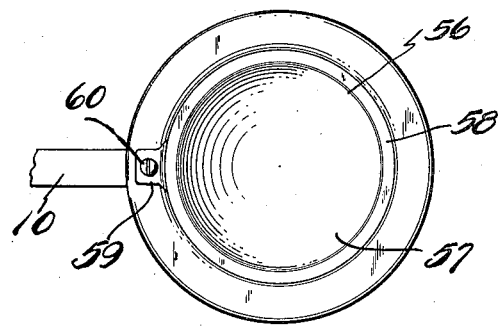
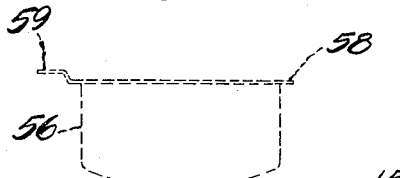
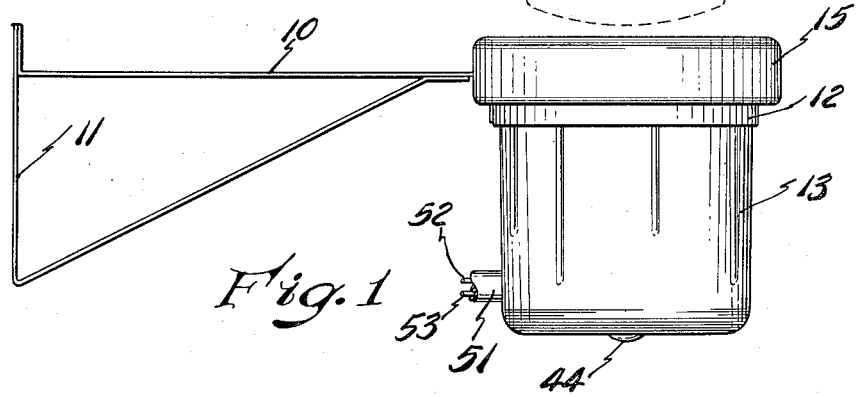
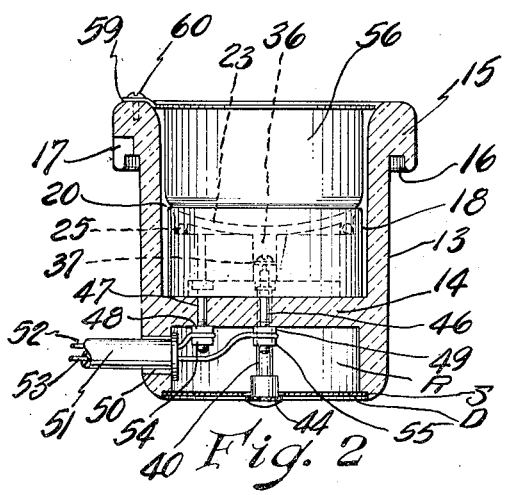

United States Patent Office 2,767,511
Patented Oct. 23, 1956

2,767,511

INSECTICIDE VAPORIZERS

Lawrence M. Kissner, Madison, Wis., and Clifford C. Chapel, Flint, and James E. Leitch and Francis C. Leitch, Owosso, Mich., assignors to De-Bug-er, Inc., Madison, Wis., a corporation of Michigan Application December 5, 1951, Serial No. 259,992

5 Claims. (Cl. 43—129)

The present invention relates to improvements in insecticide vaporizers, and more especially to a vaporizer for diffusing lindane, which is the gamma isomer of hexachlorocyclohexane which is substantially 99 percent pure, in rooms of dwellings, commercial establishments and the like for controlling and eliminating insects such as flies, mosquitoes and various forms of insect life.

One object of the invention, is to provide a vaporizer having a combined electric heating and temperature responsive switch unit which is removably mounted in the vaporizer receptacle and is arranged and constructed to maintain a constant temperature in the vaporizer such that the rate of vaporization in a building of given cubical volume can be controlled within very minute limits.

Another object, is to provide a vaporizer for diffusing lindane and other insecticides which can be supported on a wall or other surface in such a manner as to permit the removal of the vaporizer receptacle, and the dismantling of the various parts thereof to facilitate cleaning after the vaporizer has been in use for extended time periods.

Another object, is to provide a lindane vaporizer which can be conveniently adjusted such as to maintain a constant temperature of predetermined degree so as to regulate the rate of diffusion in accordance with the number of cubic feet of the room or enclosure to be treated. In lindane vaporizers the dosage depends on the cubic area or volume of the room or rooms to be treated. Hence, in treating rooms of relatively small volume the rate of vaporization for a predetermined time period, as for instance 24 hours, is regulated by the temperature applied to the lindane. For rooms of large volume a slightly higher temperature is applied and vice versa.

Another object, is to provide an insecticide vaporizer having an electric heating and bi-metallic temperature responsive switch or thermostat unit having a concave surface for receiving a correspondingly shaped convex lower wall portion of the lindane receptacle, so that the heat will be more evenly distributed throughout the lindane mass and permit regulation of the electric heating element within very small and minute temperature ranges.

Another object, is to provide an insecticide vaporizer including a receptacle formed of ceramic material having an annular recess and a notched portion therein for being interlockingly received in a wall bracket which can be easily removed from the bracket to permit cleaning of said vaporizer receptacle, and the removal of residual deposits of vaporized lindane.

Another object, is to provide an insecticide vaporizer for vaporizing lindane and other insecticides which is provided with an electric heating element mounted in an insulating block and having a built-in thermostatic control element in circuit therewith which can be installed and removed with respect to the vaporizer receptacle as a unit by merely unthreading the thermostatic control shaft and a pair of retaining nuts.

Another object, is to provide a vaporizer for various insecticides in which the heating element and thermostatic control switch are mounted as a unit in an insulating block with the bi-metallic element of the thermostat mounted in a cut-away portion in the insulating block so as to be fully exposed to the bottom wall of a removable lindane or other insecticide container.

Another object, is to provide an insecticide vaporizer having a removable insecticide container formed of aluminum or the like, which is held in place by a single retaining screw extending through a tab on the rim of the container and anchored in a correspondingly threaded opening in the vaporizer receptacle.

Other objects and advantages of the invention will become apparent during the course of the following description of the accompanying drawing, wherein:

Figure 1 is a side elevational view of the vaporizer showing the insecticide container removed and in dotted lines to illustrate the manner in which the container can be replaced to facilitate refilling and cleaning.

Figure 2 is a vertical cross-sectional view of the vaporizer showing the same removed from the wall bracket and the manner in which the electric heating element and temperature responsive control unit are removably mounted therein with the insecticide container arranged in superposed relation.

Figure 3 is a top elevational view of the vaporizer showing a portion of the wall bracket broken away and illustrating the retaining tab on the insecticide container removably affixed to the vaporizer receptacle.

Figure 4 is a fragmentary side elevational view showing the manner in which the vaporizer receptacle is interlockingly received in the looped portion of the wall bracket.

Figure 5 is a diametral cross-sectional view of the electric heating element and temperature responsive switch unit, showing the manner in which the bi-metallic temperature responsive arm of the switch is supported in the unit with the manual adjusting control projecting through a supporting arm and threadedly received in an opening therein, and Figure 6 is a top elevational view of the electric heating element and thermostatic switch unit, illustrating the manner in which the heating element and bi-metallic temperature responsive switch arm are mounted in recesses in the concave upper wall of said unit.

In the drawing, and more in detail, there is shown for the purpose of convenience of illustration a vaporizer for insecticides and especially for lindane which is adapted to be supported in dwellings, business and commercial buildings such as restaurants, bakeries, factories and grocery stores, which is adapted to be supported on the wall or other convenient support adjacent the ceiling of the room. The vaporizer when filled with lindane and when supplied with heat will give off a vapor which will diffuse the atmosphere and destroy insect life such as flies and mosquitoes, without causing harmful or toxic effect to human beings. The rate of vaporization is small, being in the neighborhood of 0.4 to 15 micrograms per hour per cubic foot of the room to be treated. In operating lindane vaporizers, it is necessary that the temperature be controlled to supply a constant source of heat to the lindane crystals such that they will give off a vapor, which when diffused in the atmosphere, will destroy insects such as flies and mosquitoes without causing harmful toxic effects to humans. Thus, it is seen, that the rate of vaporization is critical and the temperature range of applied heat is between 90 to 130 degrees centigrade. The temperature of the applied heat being dependent upon the room volume to be treated so that lindane vapor will pass from the vaporizer without effecting human beings and food in the treated area, but yet being capable of destroying insects such as flies and the like.

After long and continued use, lindane vaporizers become coated with a residual film through condensation of the lindane vapor on cooler parts thereof, and it is necessary to disassemble the parts from time to time to maintain the same in a clean condition. The present vaporizer is constructed such that the various parts may be easily and conveniently dismantled for cleaning, and the electric heating element and thermostatic control unit are so constructed that the same may be easily removed from the vaporizer and assembled with the manual control element projecting downwardly to a position in which it can be easily reached for manipulation.

The vaporizer of the present invention embodies a bracket 10 of triangular shape having a vertical portion 11 which is adapted to be affixed to a wall surface or other support by screws or other fastening elements. The bracket 10 is formed of strap iron, and has secured to the free end thereof a metal band 12 of circular shape and of a size or diameter to removably receive a cylindrical vaporizer receptacle 13. The vaporizer receptacle 13 has both ends open and is provided with a partition wall 14 adjacent its lower end, while the upper portion is formed to provide an enlarged beaded portion 15. The enlarged beaded portion 15 is provided with an annular recess 16 to accommodate the supporting band 12 and the bead is cut away on its peripheral wall 17 to provide an opening to accommodate the arm portion of the bracket 10. The arm portion being received in the cut away portion 17 as shown in detail in Figure 4. The receptacle 13 is preferably formed of a ceramic material and is finished to provide a glazed surface which is both attractive and pleasing in appearance.

Removably mounted within the receptacle 13 is a combined electric heating element and temperature responsive switch unit which includes a round insulating block 18 of a diameter small enough to snugly fit within the inner bore 20 of the receptacle 13. The round insulating block 18 is recessed on its underside as at 21 to provide an annular rim portion 22 which is adapted to rest upon the horizontal partition 14 and support the insulating block a slight distance thereabove. The upper surface of the round insulating block 18 is dished and cut away to provide a concave surface 23 which is shaped to conform to the bottom wall of an insecticide container. The marginal portion of the concave surface 23 is provided with an annular recess 24 which is adapted to receive an electric heating element 25 (Figs. 5 and 6) of spirally wound formation. The electric heating element being mounted in the recess 24 such as to be below the concave surface 23.

The terminal ends of the electric heating element 25 are connected to a pair of terminal posts 26 and 27, and as shown in Figure 5, the terminal post 26 is retained in place by a nut 28 and forms one of the connectors for one of the electrical conductors from a suitable source of electrical energy. The other terminal post 27 has secured thereto an arm 30 which is held in place by a retaining nut 31. The arm 30 and retaining nut 31 are mounted in a recess 33 in the bottom wall of the insulating block 18 and said arm 30 projects into a through passage 34 extending from the bottom of the block to the top thereof.

Formed in the concave wall surface 23 is an elongated recess 36 which is adapted to receive a standard bi-metallic switch arm 37 which has one end anchored in place and secured by means of a terminal screw 38 which projects downwardly and has a nut 39 received on the lower threaded end thereof. The arm 37 is made up of an upper strip of one metal and a lower strip of a dissimilar metal, the metals having different coefficients of expansion such that the unequal expansion developed in the two metals when a predetermined termperature is reached causes the arm 37 to warp or bend upwardly. The opposite end of the bi-metallic bar 37 projects above the through opening 34 in spaced overlapping relation with the fixed switch arm 30, it being noted, that the bi-metallic bar 37 is limited in its downward movement by the floor of the recess 36. A manually adjustable contact 40 is provided and includes a shaft having a threaded end 41 which extends through a correspondingly threaded opening in the outer end of the fixed contact 30 so that its free end or contact portion 42 is approximately flush with the bottom of the recess 36 and will normally engage the underside of the bi-metallic bar 37. An operating knob 44 is secured to the lower end of the control shaft 40 and has a knurled portion to facilitate easy turning and adjustment of the fixed contact 42. The bi-metallic movable switch arm 37 is constructed such that it will flex upwardly away from the contact 42 upon a temperature increase and will return to contactual engagement with the contact 42 upon a temperature drop. The circuit from the source of electrical energy when the bi-metallic arm 37 is in engagement with the contact 42 is through the terminal screw 38, contact bar 37, contact arm 30, through the electric heating element 25 and thence back to the source of electrical energy through the terminal screw 26. The device is built to diffuse at the proper rate for a given size room or building. Only a slight adjustment of the contact 41 upwardly then adapts the rate of diffusion to a room of larger cubical contents so that one unit can be used for rooms of varying size. When the cubical content of the room is so large that one unit cannot be adjusted to adequately serve, two or more units can be used.

The false bottom or partition wall 14 is provided with an opening 46 to accommodate the thermostat control shaft 40, and similarly is provided with a pair of spaced apart bores 47 for accommodating the terminal screws 26 and 38.

A recess R is provided on the lower end of the receptacle 13, this lower end being shouldered as at S, and a disk D is frictionally and releasably held in said shouldered end.

The terminal screws 26 and 38 are held in place by nuts 48 and 49, and when said nuts are tightened on the threaded terminal screws, the combined electric heating element and thermostatic control unit (Figs. 5 and 6) will be drawn down tightly against the upper surface of the false bottom or horizontal partition 14. The lower wall of the receptacle 13 below the horizontal partition 14 is provided with a radial bore 50 opening into the recess, this bore accommodating a sheathed electric cable 51 having a pair of electrical conductors 52 and 53 which are connected respectively to the threaded terminal posts 26 and 38 (Fig. 2). The electrical conductors are secured or fastened in place by anchoring nuts 54 and 55. The opposite end of the electrical cable 51 is attached to a male plug member with the electrical conductors 52 and 53 connected to the contact terminals thereof, so that the same may be inserted in a wall outlet receptacle in electrical contact with a source of energy of 110 volts.

Removably mounted in the upper end of the receptacle 13 is a container 56 which is formed of metal such as aluminum and is of general cylindrical shape of a diameter to fit within the bore 20 of the receptacle 13. The lower wall of the container 56 is convex and is adapted to conform to the concave surface 23 of the round insulating block 18 so that the same will rest thereon and provide a relatively large heating area.

The upper portion of the container 56 is provided with an annular flange 58 which is adapted to rest upon the enlarged beaded portion or annular rim 15 of the receptacle 13, and a portion of the annular flange 58 is extended to provide a tab 59 which is adapted to overlie the annular bead or rim 15 and said tab is anchored in place by a retaining screw 60 which is received in a correspondingly threaded opening in the annular bead 15.

In operation, the container 56 is filled with a quantity of lindane crystals which are substantially the same size as sugar crystals and the vaporizer receptacle 13 is affixed to the wall adjacent the ceiling by the supporting bracket 10. The electrical conductors 52 and 53 are connected to a suitable source of electrical energy to energize the electric heating element 25. When the lindane crystals become heated to a temperature of approximately 110 degrees centigrade, they will give off a vapor and a moist ring will show around the surface of the lindane mass in the container 56. If the temperature of the heating element rises above a predetermined temperature, the bi-metallic bar 37 will move away from the contact 42 and interrupt the circuit through the electric heating element 25. Upon cooling, the thermostatic bar 37 will again engage the contact 42 and close the circuit through the heating element. By adjusting the control knob 44 the temperature of the electric heating element can be controlled such that the lindane crystals will vaporize at various rates and thus adapt the vaporizer to rooms of different volume.

When the supply of lindane has been vaporized, the vaporizer may be disassembled and cleaned by simply removing the nuts 48—49 and 54—55, and unscrewing the control shaft 40 so as to displace the threaded end 41 from the correspondingly threaded opening in the fixed contact arm 30. After cleaning, the parts may be re-assembled, and after the container 57 has been replaced by the tab 59 and screw 60, the same can be refilled with another supply of lindane.

It is to be noted that the container 57, when fastened in place by the screw 60, retains the insulating block 18 in tight relation with the partition wall 14. Thus, the parts are held in their assembled relation and can easily be dismantled for cleaning and refilling.

The disc D is also readily removable and is provided with a suitable opening as shown to accommodate the operating knob 44, so that it may be adjusted without removal of the disk or other parts, this disk, however, forming a neat closure to conceal the wiring etc. from view.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What I claim is:

1. In an insecticide vaporizer, a ceramic receptacle, an insulator block mounted therein and formed with a concave surface, said surface having a substantially annular recess therein and a blade shaped recess centrally thereof, a substantially annular split electric heating element in said annular recess, the latter recess being open to said surface and of sufficient depth to fully accommodate said heating element so that the same is disposed substantially below said concave surface, a bi-metallic switch blade mounted in the blade shaped recess and secured to said block adjacent one end thereof, a vaporizer container having a convex bottom shaped to the concave surface of the insulator block and disposed in contact therewith over the entire concave surface of the block, the blade shaped recess being of sufficient depth to permit upward flexing of said switch blade without contacting said container, an axially adjustable, threaded shaft extending through said block at substantially right angles to said blade and normally into contact with the outer end thereof, and an electrical circuit connecting said heating element, shaft, and blade so that the circuit is normally energized and is broken only upon upward flexing of said blade due to an increase in container temperature beyond a predetermined limit.

2. The combination defined in claim 1 in which said receptacle is supported in upright position and includes a bottom wall spaced above the lower edge thereof for supporting said block, said bottom wall and block having openings for said shaft and the latter extending below said bottom wall.

3. The combination defined in claim 2 and including a laterally disposed plate in said block having a threaded opening supporting said adjusting shaft, a terminal screw securing said blade to the block and extending downwardly through said block and the bottom wall of said receptacle to form part of said circuit, and a conductor in said block connecting the plate with one end of said heating element to form another part of said circuit.

4. In an insecticide vaporizer, a receptacle of ceramic material having an enlarged rim portion at the upper end thereof, said rim portion having a recess formed in the under surface thereof, a substantially laterally disposed bracket adapted to be secured to a supporting surface, said bracket having a looped portion received in said recess, said rim portion having a side portion cut away to pass said bracket and provide an interlock with said bracket to prevent turning movement of said receptacle, a heating unit mounted in said receptacle, an insecticide pan received in said receptacle, and an energy source for said heating unit for energizing the latter to heat said pan.

5. In an insecticide vaporizer, a cylindrical receptacle formed of ceramic material having an enlarged rim portion at the upper end thereof, said rim portion being formed with an annular recess on the under surface thereof, a substantially laterally disposed bracket adapted to be secured to a supporting surface, said bracket having a looped portion received in said recess for supporting said receptacle, said bracket having a wall-engaging portion extending outwardly from said loop portion, the rim portion having a side portion cut away to permit passage of said outwardly extending portion and thereby providing an interlock with the same to prevent turning movement of said receptacle, a heating unit mounted in said receptacle, an insecticide pan received on said heating unit, and a source of energy for said heating unit adapted to energize the same for heating of the contents of the pan and evaporation thereof.

References Cited in the file of this patent

UNITED STATES PATENTS

| | | |
|---|---|---|
| 1,336,728 | Christensen | Apr. 13, 1920 |
| 1,349,703 | Williams | Aug. 17, 1920 |
| 1,472,170 | Haynsworth | Oct. 30, 1923 |
| 1,477,340 | Forshee | Dec. 11, 1923 |
| 1,756,787 | Goughnor | Apr. 29, 1930 |
| 1,795,328 | Brown | Mar. 10, 1931 |
| 1,868,023 | North | July 19, 1932 |
| 1,955,963 | Kein | Apr. 24, 1932 |
| 1,971,971 | Walder | Aug. 28, 1932 |
| 2,119,421 | Cross | May 31, 1938 |
| 2,190,135 | Morgan et al. | Feb. 13, 1940 |
| 2,540,095 | Buehler | Feb. 6, 1951 |
| 2,541,637 | Christopher et al. | Feb. 13, 1951 |